United States Patent [19]

Janocha et al.

[11] Patent Number: 5,110,670

[45] Date of Patent: May 5, 1992

[54] FILM FOR TRANSFER METALLIZING

[75] Inventors: Siegfried Janocha, Wiesbaden; Gunter Schloegi, Kelkheim; Lothar Bothe, Mainz-Gonsenheim; Guenther Crass, Taunusstein, all of Fed. Rep. of Germany

[73] Assignee: Hoechst Aktiengesellschaft, Frankfurt am Main, Fed. Rep. of Germany

[21] Appl. No.: 365,711

[22] Filed: Jun. 14, 1989

[30] Foreign Application Priority Data

Jun. 25, 1988 [DE] Fed. Rep. of Germany ....... 3821582

[51] Int. Cl.$^5$ .................. B32B 27/08; B32B 27/32
[52] U.S. Cl. ........................ 428/216; 428/330; 428/331; 428/325; 428/312.6; 428/312.8; 428/317.9; 428/516; 428/327; 264/176.1; 524/581; 524/582
[58] Field of Search .............. 428/216, 321, 516, 331, 428/325, 330, 312.6, 312.8, 317.9, 910

[56] References Cited

U.S. PATENT DOCUMENTS

| | | | |
|---|---|---|---|
| 4,230,767 | 10/1980 | Isaka et al. ................. | 428/516 |
| 4,604,322 | 8/1986 | Reid ............................ | 428/332 |
| 4,666,772 | 5/1987 | Schinkel et al. ............ | 428/516 |
| 4,692,837 | 9/1987 | Crass et al. ................. | 361/313 |
| 4,704,323 | 11/1987 | Duncan et al. .............. | 428/286 |
| 4,777,081 | 10/1988 | Crass et al. ................. | 428/215 |
| 4,904,325 | 2/1990 | Crass et al. ................. | 156/233 |
| 4,975,315 | 12/1990 | Bothe et al. ................. | 428/216 |

FOREIGN PATENT DOCUMENTS 0216342 4/1987 European Pat. Off. .
0263963 4/1988 European Pat. Off. .

OTHER PUBLICATIONS

"Transfer Metalization an Alternative to Aluminium Foil Laminates and Metalised Papers", Export Polygraph International H. 2, p. 108 (1986).

T. J. Henman, "World Index of Polyolefine Stabilizers", Kogan Page Ltd., London, (1982), pp. 12, 202-219, 240-243.

Primary Examiner—P. C. Sluby
Attorney, Agent, or Firm—Foley & Lardner

[57] ABSTRACT

A biaxially stretch-oriented film, suitable for the process of transfer metallizing, which comprises a base layer coextruded with covering layers on either side thereof and comprising an inert admixture is disclosed. The three layers are formed of polyolefin and the base layer comprises an additive which migrates from the base layer into the covering layers. The base layer contains the inert admixture in the form of finely divided particles, which partially protrude from the base layer and are completely enveloped by the covering layers. At least one of the two outer surfaces of the covering layers displays, at least in partial areas, an increased roughness attributable to the particles protruding from the base layer.

27 Claims, No Drawings

FILM FOR TRANSFER METALLIZING

BACKGROUND OF THE INVENTION

The present invention relates to a biaxially stretch-oriented film suitable for the process of transfer metallizing. More particularly, the present invention relates to films comprising a base layer which is coextruded with a covering layer on either side thereof and which comprises an inert admixture and an additive capable of migrating into the covering layers. Such films are disclosed, for example, in EP-A-0 175 259 and EP-A-0 216 342. These known films contain inert admixtures, but these are only present in the covering layers, in very small quantities. The admixtures serve to improve the slip and/or blocking resistance of the film.

The packaging industry requires great quantities of metallized papers and cardboard articles. The metal layer ensures good barrier properties to prevent flavor, grease, moisture and atmospheric oxygen from escaping or penetrating, respectively, and it gives the products a very attractive appearance. Paper provided with a metal layer is thus excellently suitable for use as a packaging material for tobacco products, ice cream, chocolates, sweets, chewing gum or for fatty foodstuffs, such as butter or cheese. Metallized paper is further used for the packaging of cosmetic products or of sterile articles for medical applications. Another field of use is the production of labels. In these applications, the metal layer is usually printed.

For the production of the paper-metal composite materials the process of transfer metallizing has proved successful in recent years. In a transfer process, the metal layer is transferred from a vacuum metallized polypropylene film to the paper. The following individual steps are performed in this process: Continuously metallizing the film web by vapor-depositing a metal layer; coating the metal layer applied to the film or the paper with an adhesive; laminating to produce a composite structure comprising film-metal-adhesive-paper; curing the adhesive; delaminating the composite structure, i.e., separating it at the metal-film interface and peeling off the film. The film used as the metal transfer medium is then wound up and is thus ready for another metallizing operation. Using appropriate formulations it is possible to metallize the film more than 40 times.

The adhesive is normally cured during storage of the laminated composite structure within a couple of days or also "in-line" by electron beam curing, i.e., by irradiating the composite structure with high-energy electrons. Curing of the adhesive by means of electron beams has gained increasing importance in the transfer metallizing process (cf., for example, "Export Polygraph International", No. 2, page 108 (1986).

The paper obtained by means of transfer metallizing has a very smooth, mirror-like, high-gloss metallic surface, and because of this decorative characteristic it is frequently used for the production of high-quality gift paper, greeting cards and packages, in which the metal layer is printed.

In other fields of application, in contrast, the metal layer of the paper-metal composite should have a matte finish or a textured surface or surface areas with varying degrees of gloss should be produced.

It has now been found that the polypropylene films which have hitherto been employed for transfer metallizing are less suitable for use in the process, if the adhesive applied is hardened by the action of electron beams, because the mechanical properties of the film are impaired by the electron beams. As a result, the rate of reuse, i.e., the possibility of metallizing the film repeatedly, is reduced to such an extent that the process can no longer be carried out in an economical way.

SUMMARY OF THE INVENTION

Accordingly, it is an object of the present invention to provide an improved oriented polyolefin film for transfer metallizing.

Another object of the present invention is to provide a film which ensures a high rate of reuse in the application as a medium for transferring metal layers to paper, both when using adhesives which are cured during storage and adhesives which are cured by the action of electron beams.

A further object of the present invention is to provide a film which is capable of displaying a reduced gloss, a matte finish or a textured surface.

Yet another object of the present invention is to provide a film which is capable of providing an improved printability to a metal layer which has been transferred to paper.

In accomplishing the foregoing objectives, there has been provided, in accordance with one aspect of the present invention, a biaxially stretch-oriented film which comprises a base layer comprising a polyolefin, an additive and an inert admixture in the form of finely divided particles, and a covering layer on either side of the base layer and coextruded therewith comprising a polyolefin, wherein the additive migrates from the base layer into the covering layers, and wherein the particles partially protrude from the base layer and are completely enveloped by covering layers, such that at least one of the two covering layers displays in at least a portion of the outer surface area thereof an increased roughness.

In accordance with another aspect of the present invention there is provided a process for metallizing a support material comprising the step of transferring a metal layer to the support material using a film as described above.

In accordance with still another aspect of the present invention there is provided a composition for the preparation of the above-described base layer.

In accordance with yet another aspect of the present invention there is provided a process for the preparation of the above-described film.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

DETAILED DESCRIPTION OF THE PREFERRED EMBODIMENTS

The film according to the present invention has the advantage that even adhesives which are cured by electron beams can be used in transfer metallizing, without giving rise to any substantial deterioration of the mechanical properties of the film. The film can be used for transfer metallizing more than 40 times. The metal layers transferred to paper exhibit a reduced gloss or a matte finish.

The film is biaxially oriented, i.e., oriented by stretching in the longitudinal and transverse directions. It comprises a base layer and external covering layers, which have been coextruded. The three layers are formed of homopolymers, copolymers or terpolymers of alpha olefins containing 2 to 6 carbon atoms or mixtures thereof, in particular of propylene homopolymers and/or propylene copolymers, preferably of propylene copolymers or propylene terpolymers with ethylene and/or alpha olefins containing 4 to 6 carbon atoms. The amount of propylene homopolymer is preferably at least 80% by weight, in particular at least 90% by weight, based on the weight of the polymer mixture.

The viscosities of the polymers forming the base layer and the covering layers are specified as melt flow indices. The melt flow index of the base layer exceeds 5 g/10 min. It is preferably in the range from about 6 to 20 g/10 min and has a lower value than the melt flow index of the covering layers. The values of the melt flow indices are determined according to DIN 53 735, at 230° C. and under a load of 2.16 kp.

The film normally has a total thickness of about 20 to 80 $\mu$m, in particular 30 to 60 $\mu$m. The covering layers are thin, as compared with the base layer and preferably have a thickness of about 0.3 to 5 $\mu$m, in particular 0.5 to 2.5 $\mu$m. The covering layers are either equally thick or vary in thickness.

If required, the layers of the film contain appropriate additives, such as antioxidants, antistatics and/or stabilizers, in each case in an effective amount. In a preferred embodiment, the base layer and the covering layers contain at least 0.4% by weight of stabilizer, in particular, sterically hindered phenols.

In order to be suitable for use as a transfer metallizing film it is important that the base layer of the film should contain additives, which gradually migrate from the base layer into the covering layers and thus also get to the outer surfaces of the film. Such substances comprise, for example, amines having hydroxyalkyl groups (alkyl: $C_2$ or $C_3$) and long chain alkyl groups (alkyl: $C_{14}$ to $C_{20}$, in particular, N,N-bis-hydroxyethyl-($C_{14}$ to $C_{20}$)-alkylamine and/or fatty acid amides with 10 to 25 carbon atoms, such as stearic amide. The amount of these additives is preferably higher than in the case of known polypropylene films for transfer metallizing, which do not contain inert particles in their base layer, and preferably ranges from about 0.2 to 2.5% by weight, relative to the weight of the base layer. In the event of an increased content of inert particles, a higher amount of these additives should be included. The use of these compounds is described in EP-A-0 175 259.

It is moreover particularly advantageous to subject one surface of the film web to an electrical corona discharge, prior to the first application of a metal layer. The other, non-treated surface of the film serves for transfer metallizing. This pretreatment treatment of the film is described in EP-A-0 216 342.

Other than in the transfer metallizing films described in the prior art, the inert admixture is present in the base layer and is finely divided therein in the form of particles. The average particle size is advantageously about 0.03 to 4 $\mu$m, preferably 0.3 to 1 $\mu$m. The content of inert admixture usually amounts to about 1 to 25% by weight, in particular 5 to 15% by weight, relative to the weight of the base layer. The inert admixture comprises, in particular, pulverulent inorganic substances, for example, carbonates of alkali metals or alkaline earth metals, such as calcium carbonate (chalk), sulfates, such as barium sulfate and/or oxides, such as inorganic silicon compounds, in particular magnesium silicate (talcum), Na-Al-silicate, silicon dioxide, glass or titanium dioxide or mixtures of these compounds. The compounds which are in the form of fine particles, e.g., a powder, are worked into the plastic melt forming the base layer and are dispersed therein during extrusion of the film. Particularly advantageously the inert particles and the other additives are incorporated in the base layer according to the master-batch technique.

In another embodiment, the inert particles comprise an organic plastic material, which is incompatible with the polymers of the base layer and the covering layers and has a higher melting point. Polymers of this kind include styrene polymers and acrylic polymers, in particular polystyrene and polymethyl methacrylate, fluorinated hydrocarbon polymers, polyamides and polyesters.

The inert particles partially stand out from the base layer and their protruding surfaces are completely enveloped by the covering layer. In a preferred embodiment, at least one of the covering layers has a thickness which is smaller than the average particle size. The particles standing out from the base layer impart a profiled surface texture to this relatively thin covering layer and, as a result, the corresponding film surface has an increased roughness. By varying the concentration of the inert particles, the average particle size and the thickness of the covering layer, this film surface can be adjusted to the desired roughness. The average peak-to-valley height of the film surface (surface roughness $R_z$) is appropriately about 0.5 to 5 $\mu$m, in particular 1 to 4 $\mu$m, measured according to DIN 4768. When a metal layer is applied to the film surface with increased roughness, the surface of the metal layer shows a matte finish after having been transferred to paper. A film which has a thicker covering layer on the opposite side, such that the particles of the base layer can no longer influence the surface texture of the covering layer, can also be used for the production of high-gloss metal layers, when this opposite surface of the film is used for transfer metallizing.

In a preferred embodiment, the base layer has a porous structure. As a consequence of this, the density of the film is lower than the density determined purely by way of calculation, based on the mixture of polypropylene and inert particles employed. The film density is, in particular, about 0.50 to 0.85 g/cm$^3$. A film whose density is too low has an insufficient strength for transfer metallizing, whereas a film with too high a density cannot properly be embossed. The porous structure results from microcracks, voids, microcavities or vacuities, which have formed during stretching of the coextruded film. Stretching is carried out under temperature conditions, at which the polymer matrix of the base layer tears open at the surfaces of the inert particles and thus forms the free, empty, unfilled spaces (voids, microcavities, vacuities) in the film. By increasing the concentration of the solid particles, a greater number of voids can be produced and the density of the film can thus be reduced.

It is also possible to provide the film, particularly if it has a relatively low density, with an additional embossed pattern which is reproduced on the metal layer to be transferred. If film surfaces are embossed with appropriate tools, they lose their profiling in the areas of pressure application. Depending on the size and surface structure of the embossing tool the film is, partially or over its entire surface, provided with a smooth, rough and/or profiled texture. This texture may be in the form of grooves, depressions or other patterns, for example, of an ornamental character. As a consequence, the metal surface in these areas also exhibits increased or reduced gloss and/or a corresponding texture, depending on the surface finish of the film.

The preferred film raw material for the base layer thus comprises not only the thermoplastic polymer, but also migrating additives, in particular from the group of long chain alkylamines and fatty acid amides and inert inorganic or organic particles. In a preferred embodiment, the film raw material employed for the base layer contains at least one stabilizer, as used in the same manner in the covering layers. These compounds are appropriately used in this film raw material for the base layer in an amount of more than 0.4% by weight, preferably of up to about 1% by weight. They lead to a reduction of oxidation phenomena of the film. Suitable stabilizers are described by T. J. Henman in the publication "World Index of Polyolefin Stabilizers", Kogan Page Ltd., London, 1982 and also in EP-A-0 222 296. Particularly suitable are sterically hindered phenols, such as, for example 1,3,5-trimethyl-2,4,6-tris(3,5-di-tert.-butyl-4-hydroxybenzyl)benzene. These substances surprisingly contribute to the fact that the film can be reused many times in the transfer metallizing process, even when it is subjected to electron beams to cure the adhesive layer.

For the preparation of the transfer metallizing film according to the present invention the well-known coextrusion process is used. In this process, the melts corresponding to the layers of the film are coextruded through a flat sheet die, the coextruded film is cooled for solidification, the solidified film is biaxially stretched (in the longitudinal direction preferably about 4 to 7 times and in the transverse direction preferably 7 to 10 times) and the biaxially stretched film is heat-set. First the mixture (film raw materials) corresponding to the base layer and to the two covering layers are prepared by mixing the individual components. These mixtures are fluidified and compressed in an extruder. The melts obtained are then simultaneously extruded through a flat sheet die (slot die) and the extruded multilayer film is cooled and solidified on at least one roll which is maintained at about 30° C. to 50° C. by cooling. Longitudinal stretching is preferably carried out at a film temperature of about 120° C. to 140° C., transverse stretching preferably at a film temperature of about 160° C. to 180° C. Biaxial stretching is preferably consecutively performed, i.e., first in the longitudinal and then in the transverse direction.

Longitudinal stretching is appropriately carried out with the aid of two rolls running at different speeds, corresponding to the desired stretching ratio and transverse stretching is effected with the aid of an appropriate clip tenter. For heat setting (heat treatment) the film is kept at a temperature of about 150° C. to 160° C. for about 0.5 to 10 seconds.

When the film is used for metallizing a sheet-shaped support material, such as paper, cardboard or glass, the process is carried out in the customary manner. The film is subjected to high-vacuum metallization. An adhesive layer is applied to the metal layer of the film-metal material or to that surface of the sheet-shaped support material, which is to be provided with the metal layer, and the composite comprising film-metal-adhesive layer-support material is then prepared. After curing of the adhesive, which takes place during storage of the film or "in-line" by the action of electron beams, the film is peeled off, wound up and used again in this process. In the resulting composite of metal and sheet-shaped support material, the metallic surface shows a matte finish, its gloss value being smaller than 90%, in particular below 60% (measuring angle 85°). The surface is excellently suitable for printing. Metallized paper prepared according to this process is advantageously used for the production of labels, gift paper and cards, in particular, greeting cards, its matte metal surface being printed, if desired.

The invention is explained in detail by the examples which follow. The gloss values indicated were measured at a measuring angle of 85°, using a reflectometer (manufacturer Dr. Lange, Neuss, Federal Republic of Germany).

EXAMPLE 1

A three-layer polypropylene film formed of a base layer and two covering layers was extruded through a slot die at an extrusion temperature of about 250° C., according to the coextrusion process. The melt used for the base layer comprised 89.5 parts by weight of a propylene homopolymer having a melt flow index of 16 g/10 min and contained 9.6 parts by weight of chalk powder with an average particle diameter of 3 $\mu$m, 0.5 part by weight of steric amide and 0.5 part by weight of N,N-bis-hydroxyethyl-($C_{18}$-alkyl)-amine and, in addition, 0.5 part by weight of 1,3,5-trimethyl-2,4,6-tris(3,5-di-tert.-butyl-4-hydroxybenzyl)benzene as a stabilizer. One of the two covering layers (covering layer 1) comprised a propylene homopolymer having a melt flow index of 24 g/10 min and the other covering layer (covering layer 2) comprised a random copolymer of ethylenepropylene-1-butene ($C_2$:2.5% by weight; $C_4$:4.2% by weight) having a melt flow index of 28 g/10 min. The film, which had solidified on the take-off roll, was heated to the stretching temperature in a heating channel and first longitudinally stretched in a ratio of 5.5 at a temperature of 130° C. and then transversely stretched in a ratio of 9.5 at a temperature of 165° C. The film was subsequently heat-set for 5 seconds at 160° C. The multilayer film had a total thickness of 40 $\mu$m, covering layer 1 was 2 $\mu$m thick and covering layer 2 was 0.6 $\mu$m thick.

Covering layer 2 of the multilayer film was used 40 times in the transfer metallizing process. The metal layer transferred to paper had a gloss of 55%. Subsequently, covering layer 1 was employed in the transfer metallizing process. In this case, the metal layer transferred to paper showed a gloss of 75%. Since covering layer 1 had a greater thickness, its surface was less rough and, as a result the metal layer had a higher gloss. A sample of this multilayer film was embossed on its covering layer 2, using a smooth embossing tool. The embossed covering layer 2 was used for transfer metallizing. In the embossed region of the film, the surface of the metal layer transferred to paper showed an increased gloss of 95%, as against the non-embossed region. The remaining metal surface transferred from the region of the film, which had not been embossed, showed a gloss value of 55%, as already determined above.

EXAMPLE 2

Another multilayer film was prepared with unchanged process parameters, analogously to Example 1. The two covering layers were identical and corresponded to covering layer 2 (copolymer, 0.6 μm thick). The metal layer obtained according to the transfer metallizing process exhibited a gloss of 55%.

What is claimed is:

1. A biaxially stretch-oriented film suitable for the process of transfer metallizing which comprises
    (a) a base layer comprising a polyolefin containing an additive and an inert admixture in the form of finely divided particles, and
    (b) a covering layer on either side of said base layer and coextruded therewith comprising a polyolefin, wherein said additive migrates from said base layer into said covering layers, and wherein said particles partially protrude from said base layer and are completely enveloped by said covering layers, such that at least a part of the outer surface area of one of the two covering layers is rough.

2. A film as claimed in claim 1, wherein said outer surface in the area of increased roughness has an average peak-to-valley height of about 0.5 to 5 μm.

3. A film as claimed in claim 2, wherein said average peak-to-valley height is 1 to 4 μm.

4. A film as claimed in claim 1, wherein the content of inert admixture is about 1 to 25% by weight relative to the weight of the base layer.

5. A film as claimed in claim 4, wherein the content of inert admixture is 5 to 15% relative to the weight of the base layer.

6. A film as claimed in claim 1, wherein the particles of said inert admixture have an average particle size of 0.03 to 4 μm.

7. A film as claimed in claim 6, wherein the particles of said inert admixture have an average particle size 0.3 to 1 μm.

8. A film as claimed in claim 1, wherein the inert admixture comprises inorganic solid particles.

9. A film as claimed in claim 8, wherein said inorganic solid particles are carbonates, sulfates, inorganic silicon compounds or oxides.

10. A film as claimed in claim 9, wherein said inorganic solid particles are calcium carbonate, barium sulfate, magnesium silicate, sodium aluminum silicate, silicon dioxide, glass or titanium dioxide particles.

11. A film as claimed in claim 1, wherein said inert admixture comprises solid organic plastic particles which are incompatible with and have a higher melting temperature than said polyolefins.

12. A film as claimed in claim 11, wherein said organic plastic particles are polymer particles comprising styrene or acrylate units, fluorinated hydrocarbon particles, polyamides or polyesters.

13. A film as claimed in claim 1, wherein said base layer has a porous structure having a plurality of voids, and wherein said particles are present in said voids.

14. A film as claimed in claim 13, wherein the density of said film is between about 0.50 and 0.85 g/cm$^3$.

15. A film as claimed in claim 1, wherein the total thickness of said film is about 20 to 80 μm.

16. A film as claimed in claim 1, wherein the thickness of said covering layers is about 0.3 to 5 μm.

17. A film as claimed in claim 1, wherein said base layer comprises a stabilizer.

18. A film as claimed in claim 17, wherein at least one of said covering layers comprises a stabilizer.

19. A film as claimed in claim 17, wherein said stabilizer is a sterically hindered phenol.

20. A film as claimed in claim 17, wherein the amount of said stabilizer is about 0.4 to 1% by weight relative to the weight of the layer concerned.

21. A film as claimed in claim 1, wherein at least a portion of the surface of said film displays an embossed pattern or a modified gloss.

22. A film as claimed in claim 1, wherein said polyolefin is a homopolymer, copolymer or terpolymer of ($C_2$–$C_6$) alpha olefins or a mixture thereof.

23. A film as claimed in claim 22, wherein said polyolefin comprises propylene homopolymer.

24. A film as claimed in claim 23, comprising at least 80% by weight of propylene homopolymer, based on the weight of the polymer mixture.

25. A film as claimed in claim 1, wherein said additive is a ($C_2$–$C_3$) hydroxyalkylamine, a ($C_{14}$–$C_{20}$) alkylamine or a ($C_{10}$–$C_{25}$) fatty acid amide.

26. A film as claimed in claim 25, wherein the amount of said additive is about 0.2 to 2.5% by weight.

27. A film as claimed in claim 1, wherein said base layer further comprises a stabilizer.

* * * * *

UNITED STATES PATENT AND TRADEMARK OFFICE
CERTIFICATE OF CORRECTION

PATENT NO. : 5,110,670

DATED : May 5, 1992

INVENTOR(S) : Siegfried Janocha et al.

It is certified that error appears in the above-identified patent and that said Letters Patent is hereby corrected as shown below:

On the title page:

Item: [75]   Inventors:   "Gunter Schloegi" should read --Gunter Schloegl--.

Signed and Sealed this

Tenth Day of August, 1993

Attest:

MICHAEL K. KIRK

*Attesting Officer*   *Acting Commissioner of Patents and Trademarks*